US005474831A

United States Patent [19]

Nystrom

[11] Patent Number: 5,474,831

[45] Date of Patent: Dec. 12, 1995

[54] BOARD FOR USE IN CONSTRUCTING A FLOORING SURFACE

[76] Inventor: Ron Nystrom, 7216 Backlick Rd., Springfield, Va. 22153

[21] Appl. No.: 912,774

[22] Filed: Jul. 13, 1992

[51] Int. Cl.[6] .......... B32B 1/00

[52] U.S. Cl. .......... 428/174; 428/156; 428/167; 428/212; 428/213; 404/46

[58] Field of Search .......... 428/172, 167, 428/174, 156, 212, 213, 192, 220; 52/514, 553; 404/46, 96, 114; 114/136 R, 270, 254, 349

[56] References Cited

U.S. PATENT DOCUMENTS

| | | | |
|---|---|---|---|
| 55,154 | 7/1873 | Wands | 177/144 |
| 168,672 | 10/1875 | Reed . | |
| 482,536 | 9/1892 | Zegelmeyer . | |
| 1,931,709 | 10/1933 | Schaffert | 52/314 |
| 2,094,910 | 10/1937 | Baily | 404/96 |
| 2,571,603 | 10/1951 | Payzant | 144/125 |
| 3,287,203 | 11/1966 | Elmendorf | 161/123 |
| 4,384,621 | 5/1983 | Bitzel | 173/32 |
| 5,059,474 | 10/1991 | Yoshida | 428/174 |

*Primary Examiner*—Donald J. Loney
*Attorney, Agent, or Firm*—Dennis H. Lambert

[57] ABSTRACT

A board for use in constructing exterior floors has a rounded or curved convex top surface to shed water, and a complementally shaped rounded or curved concave bottom surface for nesting engagement with the top surface of an adjacent board so that a plurality of the boards may be stacked in stable relationship. The radius of curvature of the rounded top surface is such that a floor formed by a plurality of the boards placed side-by-side provides a comfortable surface on which to stand and walk. In a modification, the bottom surface has a plurality of stress-relief channels formed therein to prevent cupping or warping of the board.

20 Claims, 3 Drawing Sheets

BOARD FOR USE IN CONSTRUCTING A FLOORING SURFACE

FIELD OF THE INVENTION

This invention relates to construction material for use in a flooring surface. More particularly, the invention relates to a board for use in constructing an exterior floor.

BACKGROUND OF THE INVENTION

A variety of specialized flooring materials have been developed for interior and exterior use. Indoor applications are especially varied, including everything from granite and marble to hardwoods and rubber compositions. Hardwood floors for interior use typically range from individual, unfinished strips or boards that are sanded and stained or otherwise finished after being installed, to pre-finished boards and various parquet styles. The individual boards, in particular, used in hardwood flooring usually have stress relief channels cut in their underside, and tongue and groove configurations along the side edges. The major developments in interior hardwood flooring, however, have been related to the use of durable finishes, and not to the basic structural design of the wood strips.

Wood flooring materials for exterior use, such as in decks and the like, have undergone very little change since their introduction. Up until fairly recently, wood flooring for exterior use was typically found on covered porches, and was not used in constructions fully exposed to weather conditions. These floors were very close in structure and appearance to interior flooring, and generally included tongue and groove construction and other features used indoors. The same boards might even be used both indoors and outdoors, for example, with a painted surface on the boards used outdoors to aid in resisting weather.

Construction materials and methods for exterior decks and porches changed dramatically with the advent of chemically treated lumber, which enabled exterior structures to be fully exposed to the weather. The chemically treated lumber used in these structures is generally produced by subjecting untreated lumber to a process whereby the chemicals are caused to penetrate into the lumber by a vacuum or pressure technique. This makes them weather-resistant, and provides much greater flexibility in architectural style than previously used materials for exterior construction.

However, very little change has been made in the basic design of the wood building materials used in such exterior constructions. For instance, flooring or decking used in exterior decks comes in essentially only two configurations, 2×4 and/or 2×6 or 2×8 lumber, and so-called 5/4 decking boards. All of these flooring materials are essentially rectangular in cross-sectional configuration. Additionally, the 5/4 decking boards have slightly rounded top edges.

In all conventional flooring materials known to applicant, the top and bottom horizontal surfaces of these flooring materials are flat and planar. As a result, water tends to stand on the surface of the decking material, causing it to deteriorate more quickly than it otherwise would. Heretofore, the solutions to this problem included spacing the decking boards so that water can drain between them, and frequent treatment with water-proofing materials.

Further, the process used to cut such lumber from logs can produce inferior product on the outermost boards, often leading to scrap.

Consequently, there is need for an exterior decking board that is shaped to shed or drain water, and which possesses all the desireable attributes of conventional decking materials, such as ease of use and handling, low cost, and comfort, and which at the same time can result in better utilization of material as the boards are cut from a log.

SUMMARY OF THE INVENTION

Accordingly, it is an object of this invention to provide a board for use in constructing flooring, wherein the board is shaped to shed water from its upper surface and which, at the same time, is comfortable to walk and stand on.

Another object is to provide a decking board for use in exterior deck constructions, wherein the board has a convex upper surface to shed water, but which at the same time is comfortable to stand and walk on, and which includes a concave configuration in its bottom surface to facilitate stacking of the boards one on top of the other during storage and handling.

A further object of the invention is to provide a decking board which is shaped to shed water from its upper surface, and which also yields a superior product when cut from a log, reducing the amount of scrap in the outermost boards cut from a log.

These and other objects and advantages of the invention are achieved by shaping at least the top surface of a board through cutting or milling and the like, so that the board has a very slightly rounded convex upper surface sloping off to each side of the board for shedding water. In a preferred embodiment, the board has a concave bottom surface shaped complementally to the top surface to facilitate stacking of the boards on top of one another. The shaped top surface also results in a board configuration which enables more usable boards to be obtained from a log, and the shaped bottom surface lends a slight cushioning effect to the board. In another form, the board has stress-relief channel means formed in its bottom surface to prevent warping of the board.

BRIEF DESCRIPTION OF THE DRAWINGS

The invention will be understood with greater clarity in the following detailed description of the preferred embodiments, especially when considered in conjunction with the accompanying drawings, wherein like reference characters designate like parts throughout the several views, and wherein.

DETAILED DESCRIPTION OF THE PREFERRED EMBODIMENTS

Figure 1:
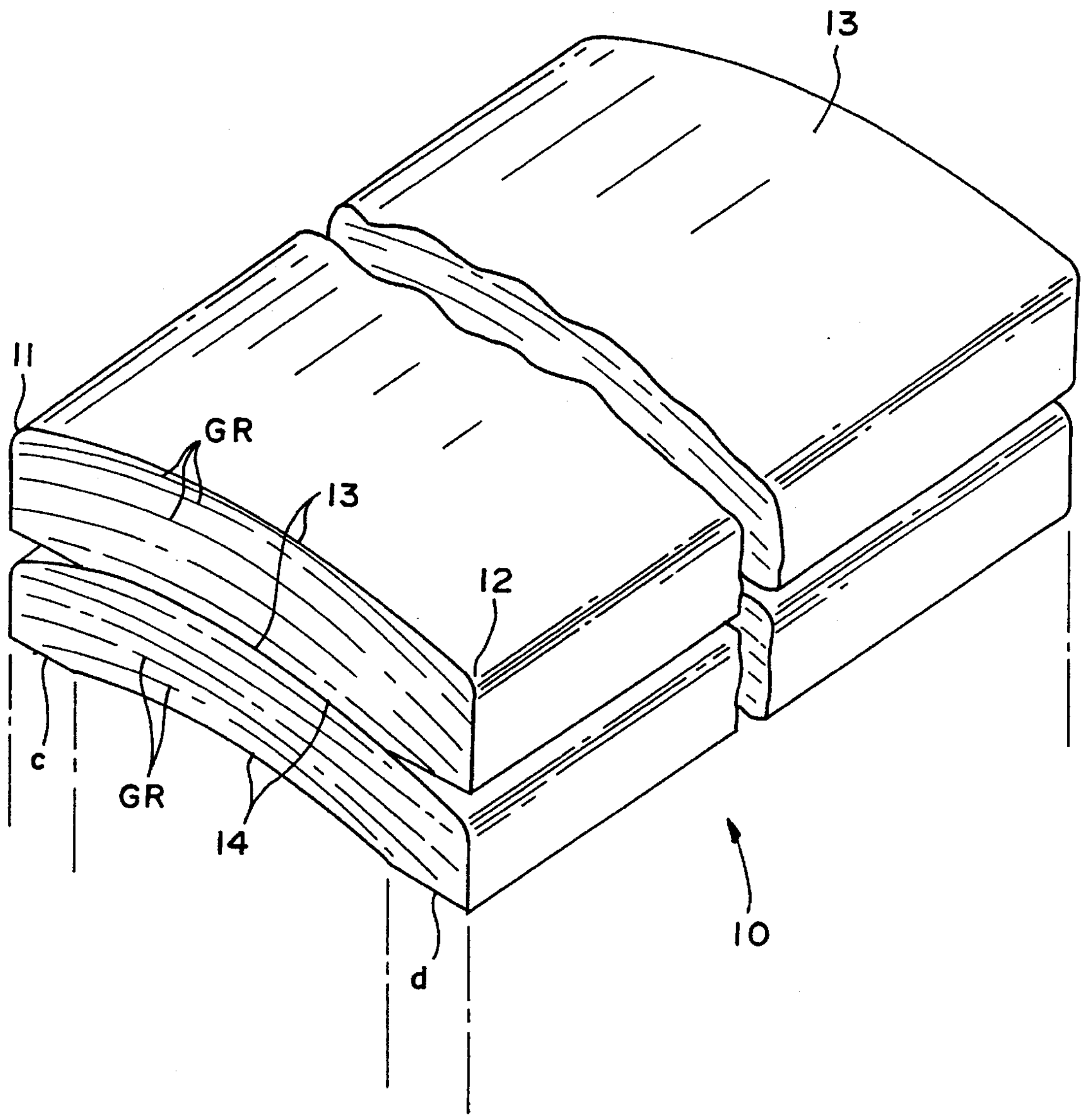
FIG. 1 is a top perspective view, with portions broken away, of a pair of boards embodying the invention shown in stacked relationship on top of one another.
Figure 2:
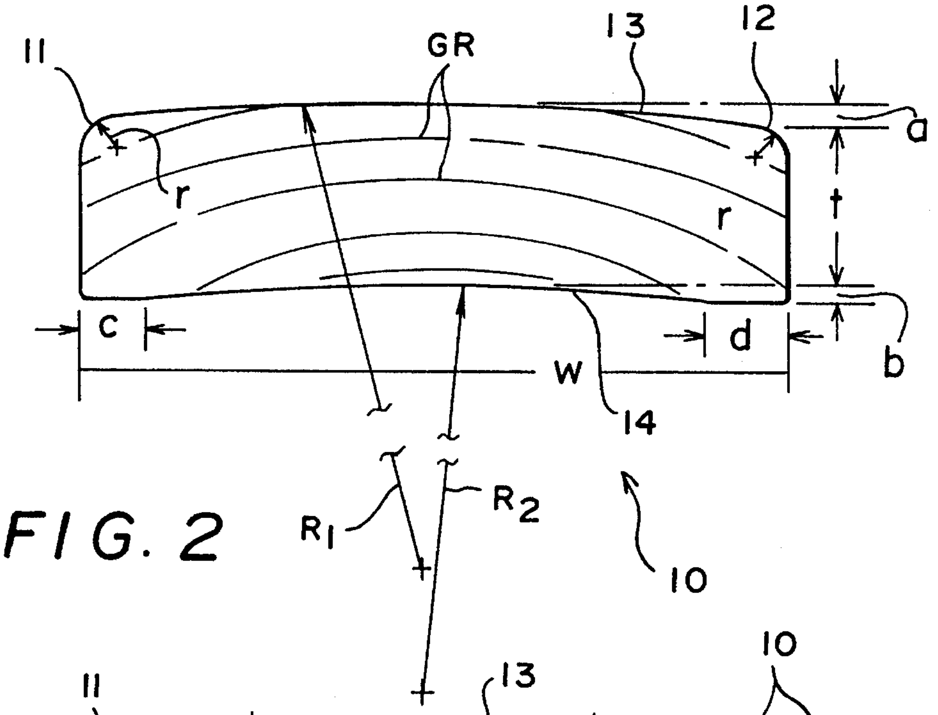
FIG. 2 is a transverse sectional view of a decking board incorporating the features of the invention.
Figure 3:
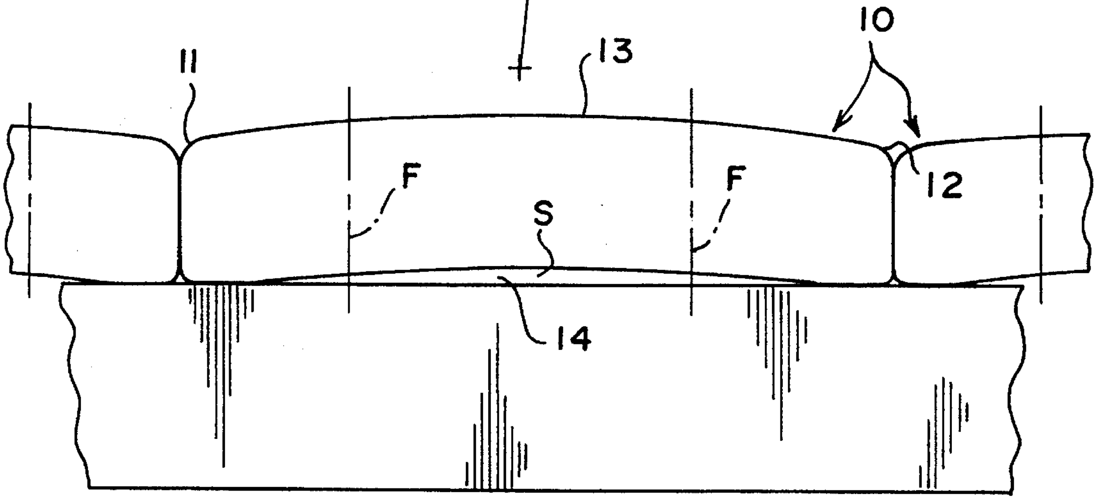
FIG. 3 is an end view of a plurality of decking boards according to the invention, shown installed in side-by-side relationship on a frame.

Referring more specifically to the drawings, a board in accordance with the invention is shown generally at 10 in FIGS. 1–3. In FIG. 1, two such boards are shown in stacked relationship one on top of the other. The board specifically shown and described herein has generally the size and shape of a so-called 5/4 decking board, with rounded top side edges 11 and 12 each having a radius of curvature r of about one-quarter of an inch. The board 10 differs slightly in width w and thickness t from a standard decking board, however, in that it has a width of only about 5 inches and a thickness of about 1⅜ inches.

More importantly, the board of the invention has a slightly rounded upper surface 13 that slopes gradually off to either side of the center of the board, defining a convex surface that promotes the running off of water. This surface may have a radius of curvature $R_1$, for example, of about 24 inches.

Further, in a preferred construction the board also has a complementally shaped concave bottom surface 14 with a radius of curvature $R_2$ of about 24 inches, placed to leave two relatively flat side panels c and d along opposite edges of the board.

The curved top surface has a total fall or drop a from the center to each side edge of about ⅛ of an inch, and the curved bottom surface similarly has a total recess b from the plane of the two side panels to the deepest part at the center of the board of about ⅛ of an inch.

With particular reference to FIGS. 1–5, it can be seen that the convex top surface 13 is curved in the same general direction as the curvature of the growth rings GR. This insures that the boards can only be installed with their growth rings oriented convex (or bark side) up. This is the proper orientation for the installation of decking boards, with reference to the orientation of the growth rings. With conventional decking materials, the boards are frequently installed improperly, with the growth rings oriented concave side up. This leads to accelerated deterioration of the boards when exposed to weather.

Moreover, and as noted hereinafter, manufacture of the decking boards in accordance with the present invention removes many, if not all, of the blemishes frequently found in conventional decking materials, including so-called No. 1 grade materials.

When stacked on top of one another, as shown in FIG. 1, the boards essentially nest within one another, with the two side panels on a top board resting on the curved outer edge portions of a subadjacent board to produce an arrangement that enables multiple boards to be stacked with essentially the same stability as conventional, flat boards. In this connection, it should be noted that the curved surfaces may be dimensioned so that the entire adjacent curved surfaces of two stacked boards are in full contact with one another, or they may be dimensioned so that just the side panels of a top board engage on the top curved surface of a bottom board.

In use, the boards are installed in close-fitting, side-by-side relationship to one another on a frame, by using fasteners F extended through the boards and into the frame. Other types of fastening methods may be used if desired. As depicted in FIG. 3, a small clearance space S is provided beneath the boards when they are installed, which provides a slight cushioning effect to the flooring surface made with the boards.

In tests conducted using the flooring of the invention, it has been found that the slightly rounded upper surface of the boards provides a comfortable surface on which to stand and/or walk.

Figure 4:
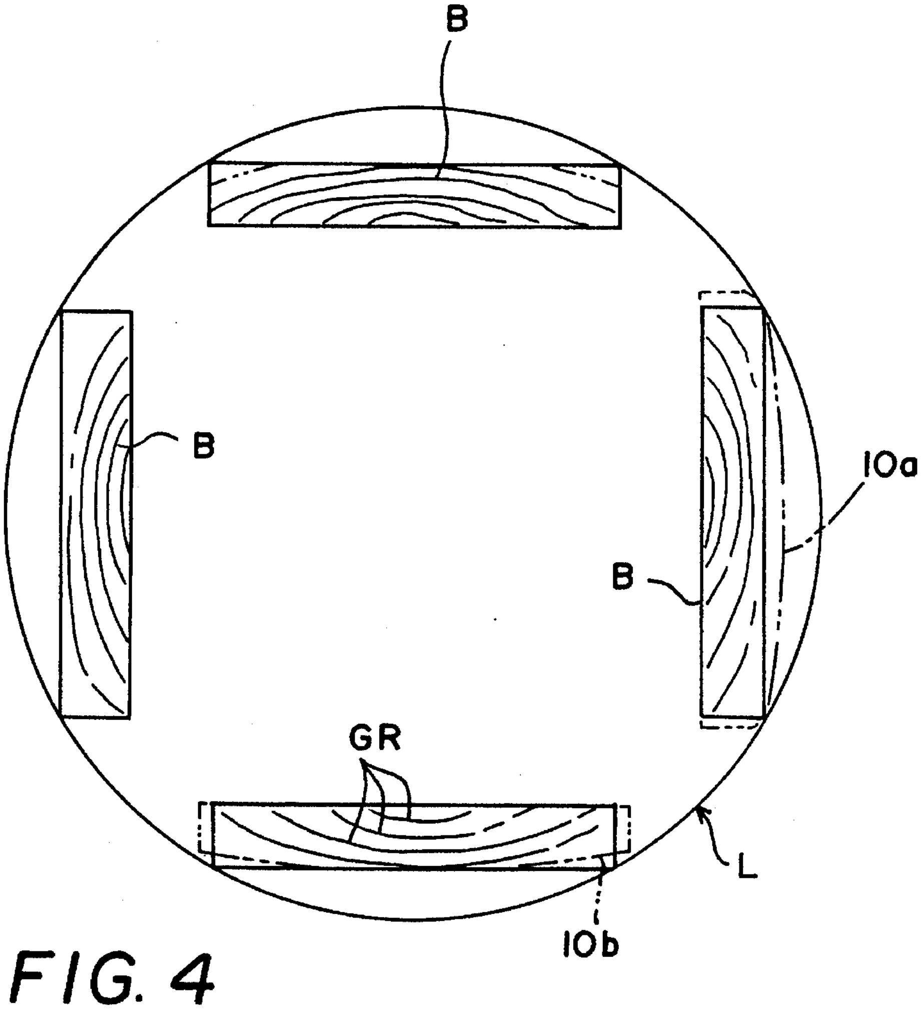
FIG. 4 is a somewhat schematic transverse sectional view of a log, showing the relationship to the outer surface of the log of several outer boards to be cut from it, illustrating a variety of ways in which the invention can lead to better utilization of material in the log.

FIG. 4 shows the relationship of the outermost boards B cut from a log L. Since these outermost boards are very near the bark or softer outer surface of the log, they frequently have defects extending along their side edges which can result in these boards being scrapped. Boards **10*a* and 10*b*** made in accordance with the invention, however, have these outer longitudinal edges rounded off, which many times results in removal of the softer material or defects commonly found in conventional boards, thus reducing the amount of scrap in these boards and utilizing more of the material in the log.

Figure 5:
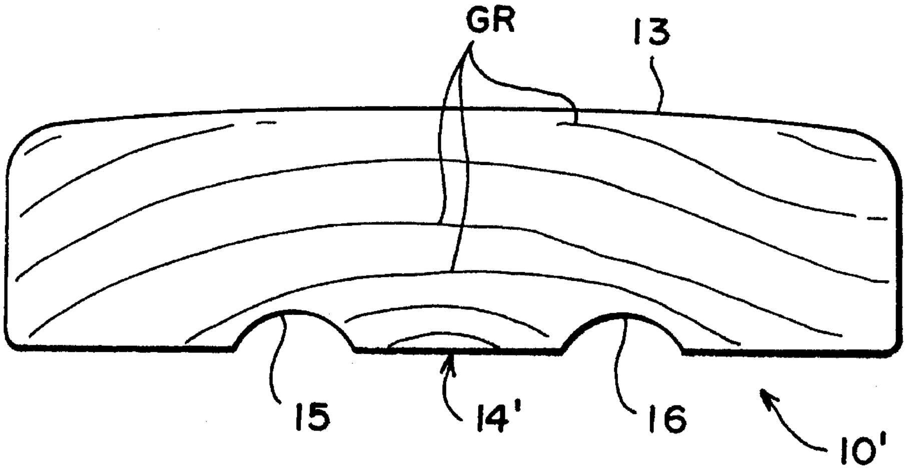
FIG. 5 is an end view similar to FIG. 2 of an embodiment of the invention in which stress relief channels are formed in the underside of the board.

In FIG. 5, a modification is shown at 10'. In this form of the invention, a pair of stress relief cuts or channels 15 and 16 are made along the underside 14' of the board to minimize cupping or warping of the board.

While the invention has been shown and described in detail, it is obvious that this invention is not to be considered as being limited to the exact form disclosed, and that changes in detail and construction may be made therein within the scope of the invention, without departing from the spirit thereof.

What is claimed is:

1. A board for use in constructing a flooring surface for exterior use, said board having a top surface, a bottom surface and opposite side edges, said top surface being manufactured to have a slightly rounded or curved configuration from a longitudinal center line thereof downwardly toward each side edge, thereby defining a convex top surface which sheds water and at the same time is comfortable to walk on, and said bottom surface having a concave configuration for nesting engagement with the top surface of another board so that a plurality of the boards may be stacked one on top of the other with the stability of conventional boards having flat top and bottom surfaces.

2. A board as claimed in claim 1, wherein:

both the top and bottom surfaces of the board are curved or rounded, with the concave curved surface on the bottom of a board being shaped complementally to the convex curved surface on the top of the board.

3. A board as claimed in claim 2, wherein:

the radius of curvature of the top surface of the board is approximately five times as great as the width of the board.

4. A board as claimed in claim 3, wherein:

the radius of curvature of the bottom surface of the board is approximately five times as great as the width of the board.

5. A board as claimed in claim 1, wherein:

said board comprises a pressure-treated decking board.

6. A board as claimed in claim 5, wherein:

both the top and bottom surfaces of the board are curved or rounded, with the concave curved surface on the bottom of a board being shaped complementally to the convex curved surface on the top of the board.

7. A board as claimed in claim 6, wherein:

the radius of curvature of the top surface of the board is approximately five times as great as the width of the board.

8. A board as claimed in claim 7, wherein:

the radius of curvature of the bottom surface of the board is approximately five times as great as the width of the board.

9. A board as claimed in claim 8, wherein:

the board comprises a 5/4 decking board having a width of about five inches and a thickness of about one and three-eighths inches, and said radius of curvature of the top surface results in a difference in level between the longitudinal center of the board and its opposite side edges of about one-eighth of an inch.

10. A board as claimed in claim 9, wherein:

said radius of curvature of the bottom surface results in a difference in level between the longitudinal center of the board and its opposite side edges of about one-eighth of an inch.

11. A board as claimed in claim 1, wherein:

the concave configuration of the bottom surface of the board extends over less than the entire width of the board, leaving a relatively narrow, flat surface along each side edge of the bottom surface of the board.

12. A board as claimed in claim 11, wherein:

both the top and bottom surfaces of the board are curved or rounded, with the concave curved surface on the bottom of the board being shaped complementally to the convex curved surface on the top of the board.

13. A board as claimed in claim 12, wherein:

the radius of curvature of the top surface of the board is approximately five times as great as the width of the board.

14. A board as claimed in claim 13, wherein:

the radius of curvature of the bottom surface of the board is approximately five times as great as the width of the board.

15. A board as claimed in claim 11, wherein:

said flat surfaces at the side edges of the board engage a supporting surface on which the board is placed to space the concave bottom surface of the board from the supporting surface and define a space for circulation of air when a plurality of the boards are stacked one on top of the other or are installed in a floor.

16. A wood decking board for use in constructing a flooring surface for exterior use, said decking board having a convex top surface, a bottom surface, opposite side edges, and curved growth rings, said top surface being smoothly and symmetrically curved from a longitudinal center line thereof downwardly to each side edge, said top surface having a radius of curvature that is approximately five times as great as the width of the board, thereby defining a smoothly shaped and shallow convex top surface which sheds water and at the same time when a plurality of the boards are placed in side-by-side relationship to one another to form a flooring surface they result in a substantially flat surface that does not produce a tactile sensation of an irregular surface, thereby providing a flooring surface that is comfortable to walk on and which is capable of satisfactorily supporting furniture and the like, and said convex top surface is formed in the board so that the growth rings are oriented in the same general direction as the curvature of the top surface, thereby insuring that the hoard will always be installed with the growth rings properly oriented to minimize the effect of cupping.

17. A board as claimed in claim 16, wherein:

the board has a width of about five inches and a radius of curvature on the top surface of about twenty four inches.

18. A decking board for use in constructing a flooring surface for exterior use, said board having a convex top surface, a bottom surface and opposite side edges; said convex top surface being manufactured to have a radius of curvature with a slightly rounded or curved configuration extending across the top surface from one side edge to the other, defining a difference in thickness between the longitudinal centerline and the opposite side edges, with the ratio of said difference in thickness to the width of the board being about 1:40; and said convex top surface serving to shed water from said board when exposed to weather, and at the same time, when a plurality of said boards are laid in side-by-side relationship, presenting a surface that is comfortable to stand and walk on.

19. A board as claimed in claim 18, wherein:

the convex top surface of the board has a radius of curvature that is about five times as great as the width of the board.

20. A board as claimed in claim 19, wherein:

the board has a width of about five inches and a thickness of about one and three-eighths inches, and said radius of curvature is about twenty-five inches, resulting in a difference in thickness between the longitudinal centerline and the opposite side edges of about one-eighth of an inch.

* * * * *